United States Patent [19]

Okada et al.

[11] Patent Number: 5,510,137

[45] Date of Patent: Apr. 23, 1996

[54] SWEET ICE STUFFS AND JELLIED FOODS

[75] Inventors: Yuzo Okada; Toshio Kato, both of Kawasaki, Japan

[73] Assignee: Ajinomoto Co., Inc., Tokyo, Japan

[21] Appl. No.: 233,272

[22] Filed: Apr. 26, 1994

[30] Foreign Application Priority Data

Apr. 28, 1993 [JP] Japan .................................. 5-102587
May 12, 1993 [JP] Japan .................................. 5-110700

[51] Int. Cl.$^6$ ................................ A23G 9/00; A23L 1/05
[52] U.S. Cl. ..................... 426/565; 426/573; 426/658; 426/804
[58] Field of Search ................................ 426/658, 565, 426/567, 573, 575, 576, 577.8, 804, 659, 660

[56] References Cited

U.S. PATENT DOCUMENTS

| | | | |
|---|---|---|---|
| 4,766,207 | 8/1988 | Deger et al. | 426/658 |
| 4,869,915 | 9/1989 | Inayoshi et al. | 426/565 |
| 5,026,566 | 6/1991 | Roser | 426/443 |
| 5,034,239 | 7/1991 | Mauro et al. | 426/578 |
| 5,035,912 | 7/1991 | Furscik et al. | 426/578 |
| 5,262,191 | 11/1993 | Chakraborty et al. | 426/578 |
| 5,319,048 | 6/1994 | Carosino et al. | 526/300 |

OTHER PUBLICATIONS

Chemical Abstracts, vol. 108, No. 17, Apr. 25, 1988, Y. Iijima, et al., "Manufacture of Fondant Containing Palatinase and Trehalose", p. 623, No. 149170m, JP-A-62 257 346, Nov. 9, 1987.

Chemical Abstracts, vol. 111, No. 3, Jul. 17, 1989, Y. Iijima, et al., "Manufacture of Crystalline Soft Candies Using Palatinose and Palatinose Honey", p. 518, No. 22432e, JP-A-63 309 144, Dec. 16, 1988.

Chemical Abstracts, vol. 114, No. 11, Mar. 18, 1991, K. Nishio, et al., "Manufacture of Anticariogenic Foods and Beverages Containing Palatinose and Palatinose Honey", p. 590, No. 100165y, JP-A-02 234 651, Sep. 17, 1990.

*Primary Examiner*—Jeanette Hunter
*Attorney, Agent, or Firm*—Oblon, Spivak, McClelland, Maier & Neustadt

[57] ABSTRACT

Sweet ice stuffs and jellied foods produced in accordance with the present invention using trehalose as one of raw materials are of low calorie and high-grade feeling, and sweet ice stuffs and jellied foods produced by substituting all or part of the cariogenic sugar or a substitute therefor as one of raw materials in the recipe for prior art products with trehalose and water or the like are of low cariogenicity, low calorie and high-grade feeling.

8 Claims, No Drawings

SWEET ICE STUFFS AND JELLIED FOODS

FIELD OF THE INVENTION

This invention relates to sweet ice stuffs and jellied foods whose physical properties such as solubility and smoothness in the mouth and the like are improved with the use of trehalose. It also relates to sweet ice stuffs and jellied foods which are produced by substituting the cariogenic sugars, including sucrose and the like, in the recipe of prior art products with trehalose and water or the like.

BACKGROUND OF THE INVENTION

Sugars such as sucrose and the like are used in ice creams and other sweet ice stuffs having an overrun and quality jellies, and their amounts are increased together with other components in order to produce further upgraded products having an excellent taste, physical properties, shape-holding function and the like.

However, because of the current inclination toward low calorie food, it is desirable to reduce amounts of calorie-rich components among the solid contents of ice creams and jellies as low as possible, while simultaneously providing a high grade feeling. In order to produce such low calorie products, it is necessary to use an additive material which shows significant physical property-improving effect even in a small amount, and such an additive material therefore becomes subject matter to be developed.

Also, because of the current inclination toward low cariogenic and low calorie food, it is desirable to avoid the use of sucrose and the like cariogenic sugars as far as possible by substituting other fillers for them and to reduce amounts of calorie-rich components such as sucrose as low as possible, while simultaneously providing excellent physical properties. In order to produce such low cariogenic and low calorie products, it is necessary to develop a filler which can hold water well and provide excellent physical properties.

SUMMARY OF THE INVENTION

In an aspect of the present invention, there are provided sweet ice stuffs and jellied foods which are produced using trehalose as one of the raw materials.

In another aspect of the present invention, there are provided sweet ice stuffs and jellied foods which are produced by substituting trehalose and water for all or part of the cariogenic and calorie-rich sugar moiety as one of the raw materials in the recipe of prior art products.

Other objects and advantages of the present invention will be made apparent as the description progresses.

DETAILED DESCRIPTION OF THE INVENTION

With the aim of overcoming the aforementioned problems involved in the prior art, the inventors of the present invention have conducted intensive studies and found that the addition of a small amount of trehalose is markedly effective in improving the physical properties, thereby accomplishing a first embodiment of the present invention which satisfies the first object described above.

Accordingly, the first embodiment of the present invention relates to the improvements in the physical properties of sweet ice stuffs and jellied foods, which are effected by introducing trehalose into the recipe of prior art products in which sucrose and the like sugars or their calorie-rich substitute fillers are used.

The first embodiment of the present invention will be described in detail, as follows.

The term "sweet ice stuffs" as used herein means those having an overrun, including ice creams such as an ice cream, an ice milk, a lacto ice and the like and ice sherbets.

Production processes of these sweet ice stuffs are well known in the art, and the sweet ice stuffs of the present invention can also be produced in accordance with the prior art production processes except for the use of trehalose which has not been used as one of their raw materials. The present invention, therefore, does not claim the production process itself.

Of these sweet ice stuffs, an ice cream for example can be produced, e.g., by the following known method. That is, an ice cream is produced by mixing milk or a dairy product with sugar, egg, stabilizer, emulsifier, perfume, pigment and other necessary materials such as fruit (fruit juice and fruit flesh), chocolate, nut, candy and the like, dissolving these materials in water with stirring, subjecting the resulting mixture to homogenization, sterilization and cooling steps and then placing the resulting mixture in a freezer.

Blending materials and composition for use in the production of a sweet ice stuff, such as an ice cream for instance, are not particularly limited and can be designed in accordance with any known method or a national standard if any, except for the use of trehalose.

As is commonly known, trehalose is a non-reducing disaccharide composed of two D-glucose molecules through the linkage of their reducing groups and has three isomers $\alpha,\alpha$-, $\alpha,\beta$- and $\beta,\beta$- due to their glycoside bonding patterns. Only the $\alpha,\alpha$- isomer exists in the natural world. Though trehalose is distributed widely in bacteria, fungi, algae, insects and the like, it has been produced industrially in recent years by some Japanese companies from sucrose, glucose and the like sugars as raw materials by means of fermentation or enzyme reaction.

Trehalose should be used in such an amount that the effects of the use of trehalose can be attained when the other conditions than the use of trehalose are one and the same, and the amount can be defined easily by those skilled in the art, depending on each specific case. For example, in the case of the $\alpha,\alpha$- isomer (dihydrate having a water content of about 10%), it is to be added in an amount of from 0.3 to 3%, preferably from 1 to 2%, based on the total amount of all the raw materials. The amount if smaller than 0.3% would not bear the effect of its addition, and if larger than 3% would bear no proportionally greater effect. The term "%" as used herein means "% by weight". The manner of addition and the like of trehalose can be carried out in the same manner as in the case of sucrose.

The addition effect of trehalose can be found in other sweet ice stuffs such as ice sherbet and seems to be applicable to other food articles of medium water content such as sweet jelly of beans (Japanese yokan) and the like.

The use of trehalose renders possible reduction in the prior art recipe of the amount of calorie-rich sugars such as sucrose, invert sugar, liquid sugar, glucose, starch syrup and the like, and their calorie-rich substitutes such as sugar alcohols, e.g., sorbitol, mannitol, dulcitol, maltitol, reduced saccharified starch, reduced maltose, and the like.

Decreased sweetness due to the reduction of the amount of these sugars or their substitutes may if necessary be compensated by the use of a low calorie sweetener such as aspartame or the like. For example, in the case of an ice cream, aspartame may be used in such an amount that the sweetness becomes equal to the case of the use of, e.g., 15% sucrose based on the total raw materials.

The term "jellied foods" as used herein means jellies such as a fruit jelly, a pectin jelly, a gelatin jelly, an agar jelly and the like.

Production processes of these jellies are well known in the art, and the jellies of the present invention can also be produced in accordance with the prior art production processes except for the use of trehalose which has not been used as one of their raw materials. The present invention, therefore, does not claim the production process itself.

Further descriptions about jellies will not be required herein anymore, because they are similar to those already described in the foregoing in relation to the sweet ice stuffs, except that decreased sweetness due to the reduction of the amount of sugars resultant from the use of trehalose may be compensated by the use of a low calorie sweetener such as aspartame or the like in such an amount that the sweetness becomes equal to the case of the use of, e.g., 18% sucrose.

Thus, according to the present invention, sweet ice stuffs and jellied foods of low calorie and high-class feeling can be provided.

With the aim of overcoming the aforementioned problems involved in the prior art, the inventors of the present invention have further conducted intensive studies and found that the aforementioned second object can be achieved by the use of trehalose, thereby accomplishing a second embodiment of the present invention which satisfies the second object.

Accordingly, the second embodiment of the present invention relates to sweet ice stuffs and jellied foods of low cariogenicity and low calorie, which are produced by substituting trehalose and water or the like for all or part of the cariogenic and calorie-rich sugar moiety as one of raw materials in the recipe of prior art products. As is well known, such sugars and their substitutes as referred to in connection with the first embodiment of the present invention are cariogenic as well as calorie-rich. The term "cariogenic and calorie-rich sugar moiety" as used herein means those sugars and/or their substitutes collectively.

The second embodiment of the present invention will be described in detail, as follows.

The sweet ice stuffs and jellied foods of the second embodiment of the present invention are the same as those of the first embodiment of the present invention, except that they are produced by substituting trehalose and water or the like such as low-fat milk for all or part of the cariogenic and calorie-rich sugar moiety as one of raw materials in the recipe of prior art products.

In consequence, this different point is specifically described, as follows.

By substituting trehalose and water or the like for all or part of these sugars and/or their substitutes in the recipe of prior art products, sweet ice stuffs and jellied foods acquire low cariogenicity and low caloricity, while keeping the original high-grade feeling similarly as in the case of the sweet ice stuffs or jellied foods of the first embodiment of the present invention.

Trehalose should be used in such an amount that the effects of the use of trehalose can be attained when the other conditions than the use of trehalose are one and the same, and the amount can be defined easily by those skilled in the art, depending on each specific case.

For example, in the case of the $\alpha,\alpha$- isomer (dihydrate having a water content of about 10%), it may be used as follows.

That is, when ice creams for example are produced, in the extreme case, without any sucrose in a known raw material composition by supplementing the decrement (e.g., 15g) with approximately half the weight (i.e., about 7.5g) of trehalose, and approximately half the weight (i.e., about 7.5g) water(i.e., the balance (i.e., sugar weight minus trehalose weight) being 15g−7.5g=7.5g), the physical properties of the resultant ice creams are equivalent to those of ice creams produced from such known raw material composition. In this case, however, if trehalose is used at lower than this level, it will result in sherbet-like appearance, while higher than this level will result in rice flour cake-like physical properties, thus causing a difficulty in handling the resultant product with a spoon. In consequence, when the amount of the sucrose in a known raw material composition is 15% of the total components, according to the present invention, both trehalose and water may be used, instead of the 15% sucrosepin amounts of about 7.5%(i.e., 6–9%), respectively, and the reduced sweetness may be compensated by the use of a low calorie sweetener such as aspartame or the like.

In the case of jellies, when all the sucrose in a known raw material composition is in the extreme case substituted with approximately one third the weight of trehalose and approximately two-thirds the weight of water, the physical properties of the resultant jellies are equivalent to those of jellies produced from such known raw material composition. In this case, however, if trehalose is used at lower than this level, it will result in production of a watery product, while if trehalose is used at higher than this level, it will result in too firm a physical property. In consequence, when the amount of the sucrose in a known raw material composition is 18% of the total components, according to the present invention, trehalose may be used in an amount of about 6% (i.e., 4–7%) and water in an amount of about 12% (i.e., the balance (i.e., sugar % minus trehalose %) being 18%−6%= 12%), instead of the 18% sucros, and the reduced sweetness may be compensated by the use of a low calorie sweetener as exemplified above.

Since ½ (half) or ⅓ (one-third) volume of trehalose can hold as much as ½ (half) or ⅔ (two-thirds) volume of water respectively, reduction of calorie can be effected. As a matter of course, the aforementioned amounts of trehalose can be changed between zero and about ½ or ⅓ of the sugar moiety in the recipe for prior art products. The more the trehalose is used, the less caloric and cariogenic the resultant products are.

Thus, according to the present invention, sweet ice stuffs and jellied foods having a low cariogenicity and low caloricity as well as high-grade quality can be provided by reducing the amount of the sugar in the prior art recipe, in the extreme case, up to zero, and substituting the decrement with trehalose and water or the like.

EXAMPLES

The following examples are provided to further illustrate the present invention. It is to be understood, however, that the examples are for purpose of illustration only and are not intended as a definition of the limits of the present invention.

Example 1 (Lacto ice)

(1) Formulation of raw materials

As a control composition of raw materials, 3.0% of coconut oil, 4.0% of skim milk powder, 15.0% of sucrose, 0.3% of a stabilizer, 0.3% of an emulsifier, 0.3% of vanilla essence and 77.1% of water were formulated (Composition A).

As test compositions of raw materials, three Compositions B–D were formulated by substituting the 15.0% sucrose in Composition A with 13.0% of sucrose, 2.2% of trehalose and 0.0059% of aspartame (Composition B), substituting the 15.0% sucrose in Composition A with 2.4% of reduced saccharified starch "PO-40" (manufactured by Toa Kasei Corp.) and 0.051% of aspartame (Composition C), and substituting the 15.0% sucrose in Composition A with 20.0% of "PO-40", 1.1% of trehalose and 0.0029% of aspartame (Composition D), respectively.

(2) Production process

Raw materials excluding the aspartame and flavoring agent were mixed at about 70° C., homogenized at 12,000 rpm for minutes, sterilized by heating the mixture at 70° C. for 30 minutes and then cooled. After aging overnight at 5° C., the resulting mixture was further mixed with the aspartame and flavoring agent, treated in such a manner that an overrun of 50% by volume (an intermediate value between a maximum value of 80% and a super premium value of 25% by a batch system at a temperature of about −2° C.) was provided packed in cups, hardened by 24 hours of cooling at −40° C. and then stored at 25° C.

(3) Evaluation procedure

Samples within one month of storage after their preparation were left at −18° C. since the day before the evaluation. Results of the evaluation were treated as averages of the following evaluation criteria reported by 7 skilled panelists: inferior to control, −2.0; slightly inferior to control, −1.0; similar to control, 0.0; slightly superior to control, +1.0; and superior to control, +2.0.

(4) Results of the evaluation

Results of the evaluation are shown in Table 1.

TABLE 1

| | Evaluation score | | | | |
|---|---|---|---|---|---|
| Composition | Melting in mouth | Smoothness | Comprehensive physical properties | Taste | Total |
| A: control (sucrose) | 0.0 | 0.0 | 0.0 | 0.0 | 0.0 |
| B: sucrose + trehalose | +0.7 | +1.6 | +1.4 | +1.1 | +1.6 |
| C: "PO-40" | −0.9 | −0.5 | −0.8 | −0.2 | −0.7 |
| D: "PO-40" + trehalose | +0.5 | +1.4 | +1.1 | +0.7 | +1.2 |

Example 2 (Gelatin jelly)

(1) Formulation of raw materials

As a control composition of raw materials, 15.0% of sucrose, 2.5% of gelatin, 34.0% of grape juice, 5.0% of lemon juice and 43.5% of water were formulated (Composition A).

As test compositions of raw materials, two Compositions B–C were formulated by substituting the 15.0% sucrose in Composition A with 14.0% of sucrose, 1.1% of trehalose and 0.005% of aspartame (Composition B), and substituting the 15.0% sucrose in Composition A with 14.5% of maltitol, 0.55% of trehalose and 0.0155% of aspartame (Composition C).

(2) Production process

Raw materials excluding the aspartame were mixed at about 80° C., homogenized, sterilized by heating the mixture at 80° C. for 25 minutes, further mixed with the aspartame and then cooled. The resulting mixture was then packed in cups and stored in a refrigerator.

(3) Evaluation

When the physical properties and taste of these samples were evaluated by 5 skilled panelists, the sample of Composition B was the best followed by Composition C and then Composition A.

Example 3 (Lacto ice)

(1) Formulation of raw materials

As a control composition of raw materials., the same Composition A of Example 1 was employed (Composition A).

As test compositions of raw materials, three Compositions B–D were formulated by substituting the 15.0% sucrose and 77.1% water in Composition A with 16.6% of sucrose, 75.4% of water and 0.044% of aspartame (Composition B), substituting the 15.0% sucrose and 77.1% water in Composition A with 8.3% of trehalose, 83.8% of water and 0.066% of aspartame (Composition C), and substituting the 15.0% sucrose and 77.1% water in Composition A with 4.2% of trehalose, 87.9% of water and 0.077% of aspartame (Composition D), respectively.

(2) Production process

The production process of Example 1 was followed.

(3) Evaluation

The evaluation procedure of Example 1 was followed.

(4) Results of the evaluation

Results of the evaluation are shown in Table 2.

TABLE 2

| | Evaluation score | | | | |
|---|---|---|---|---|---|
| Composition | Melting in mouth | smoothness | Comprehensive physical properties | Taste | Total |
| A | 0.0 | 0.0 | 0.0 | 0.0 | 0.0 |
| B | could not be spooned | | | | |
| C | 0.0 | −0.1 | +0.1 | +0.3 | −0.1 |
| D | −0.2 | −1.2 | −1.2 | −0.3 | −1.2 |

Example 4 (Gelatin jelly)

(1) Formulation of raw materials:

As a control composition of raw materials, the Composition A of Example 2 was employed (Composition A).

As a test composition of raw materials, the 15.0% sucrose and 43.5% water in the above Composition A were substituted with 53.0% of water, 5.5% of trehalose and 0.064% of aspartame (Composition B).

(2) Production process

The production process of Example 2 was followed.

(3) Evaluation

When these samples were subjected to the evaluation test as in Example 2, no differences were found between the control and test samples.

What is claimed is:

1. A sweet ice composition selected from the group consisting of ice cream, ice milk, lacto ice and ice sherbets, wherein said composition comprises:

a milk product, a sweetener, 0.3 to 3% trehalose as a smoothing agent and water.

2. The composition according to claim 1, wherein said composition further comprises a starch.

3. The composition according to claim 1, wherein said composition further comprises a cariogenic sugar.

4. In a sweet ice composition comprising a milk product, sucrose and water, the improvement comprising adding 6 to 9% trehalose as a smoothing agent to improve the smoothness and solubility of the composition.

5. In a sweet ice composition comprising a milk product, sucrose and water, the improvement comprising adding 0.3 to 3% trehalose as a smoothing agent to improve the smoothness and solubility of the composition.

6. In a jellied food composition comprising sucrose, water and a jellying agent, the improvement comprising adding 0.3 to 3% trehalose as a smoothing agent to improve the mouth feel of said composition.

7. A jellied food composition comprising a sweetener, 0.3 to 3% trehalose as a smoothing agent, water and a jellying agent.

8. In a jellied food composition comprising sucrose, water and a jellying agent, the improvement comprising adding 4 to 7% trehalose as a smoothing agent to improve the mouth feel of said composition.

* * * * *